US012675440B2

(12) United States Patent
Koning

(10) Patent No.: US 12,675,440 B2
(45) Date of Patent: Jul. 7, 2026

(54) CLIENT-BASED NAME CACHE HANDLING EXTERNAL TO DISTRIBUTED STORAGE SYSTEM

(71) Applicant: EMC IP Holding Company LLC, Hopkinton, MA (US)

(72) Inventor: G. Paul Koning, New Boston, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 286 days.

(21) Appl. No.: 17/504,973

(22) Filed: Oct. 19, 2021

(65) Prior Publication Data

US 2023/0118118 A1 Apr. 20, 2023

(51) Int. Cl.
*G06F 16/172* (2019.01)
*G06F 16/182* (2019.01)

(52) U.S. Cl.
CPC .......... *G06F 16/172* (2019.01); *G06F 16/182* (2019.01)

(58) Field of Classification Search
CPC .............................. G06F 16/172; G06F 16/182
See application file for complete search history.

(56) References Cited

U.S. PATENT DOCUMENTS

| | | | | |
|---|---|---|---|---|
| 7,266,555 B1 * | 9/2007 | Coates | .................. | G06F 16/182 707/831 |
| 10,423,609 B1 * | 9/2019 | Strauss | ................. | G06F 16/182 |

| | | | | |
|---|---|---|---|---|
| 11,461,322 B1 * | 10/2022 | Plenderleith | ........ | G06F 16/2456 |
| 2004/0002942 A1 * | 1/2004 | Pudipeddi | ............... | G06F 16/10 707/999.001 |
| 2007/0088669 A1 * | 4/2007 | Jaschek | ................. | G06F 16/172 707/999.001 |
| 2007/0198458 A1 * | 8/2007 | Pudipeddi | ............... | G06F 16/10 707/999.001 |
| 2008/0183662 A1 * | 7/2008 | Reed | ..................... | G06F 16/172 707/999.002 |
| 2013/0290383 A1 * | 10/2013 | Nitin | ..................... | G06F 16/137 707/822 |

(Continued)

OTHER PUBLICATIONS

"RFC 5661—Network File System (NFS) Version 4 Minor Version 1 Protocol," https://www.tech-invite.com/y55/tinv-ietf-rfc-5661-2.html, accessed Oct. 25, 2021, 20 pages.

*Primary Examiner* — Kris E Mackes
*Assistant Examiner* — Jedidiah P Ferrer
(74) *Attorney, Agent, or Firm* — Amin, Turocy & Watson, LLP

(57) ABSTRACT

Name caching can be used external to a distributed file system (DFS), such as a network file system (NFS), to reduce the complexity of facilitating a file operation at the DFS. A system that can use the name caching and request the file operation of the DFS can comprise a processor and a memory that stores executable instructions that, when executed by the processor, facilitate performance of operations. The operations can comprise, in response to a lookup operation or a file operation performed by a DFS, storing, using the processor, a name cache entry for each directory element accessed during the lookup operation or the file operation. The operations further can comprise sending, to the DFS, a single request that comprises a compound command comprising requests for a set of lookup operations and for a file operation.

17 Claims, 13 Drawing Sheets

(56) References Cited

U.S. PATENT DOCUMENTS

| | | | |
|---|---|---|---|
| 2014/0122428 A1* | 5/2014 | Zhou | G06F 16/184 |
| | | | 707/623 |
| 2015/0312342 A1* | 10/2015 | Gunda | G06F 16/172 |
| | | | 707/827 |
| 2017/0068684 A1* | 3/2017 | Hahn | G06F 16/172 |
| 2017/0374017 A1* | 12/2017 | Gautam | H04L 67/568 |
| 2018/0247076 A1* | 8/2018 | Lerner | G06F 16/9574 |
| 2018/0300355 A1* | 10/2018 | Deshpande | G06F 16/188 |
| 2019/0236296 A1* | 8/2019 | Fair | G06F 16/11 |
| 2019/0347350 A1* | 11/2019 | Ghaemi | G06F 16/27 |
| 2019/0370360 A1* | 12/2019 | Mainali | G06F 16/182 |
| 2019/0394162 A1* | 12/2019 | Chalakov | G06F 16/172 |

* cited by examiner

300

```
┌─────────────────┐                    ┌─────────────────┐
│ REQUEST         │                    │ CACHING         │
│ COMPONENT       │                    │ COMPONENT       │
│ 128             │                    │ 126             │
└─────────────────┘                    └─────────────────┘
```

*executes*

*reads*

```
┌─────────────────┐
│ Name Cache Lookup│
│ 303             │
└─────────────────┘
```

```
┌──────────────────────────┐
│ File Path 202            │
│                          │
│   ┌──────────────────┐   │
│   │ File of Interest │   │
│   │ 204              │   │
│   └──────────────────┘   │
│                          │
└──────────────────────────┘
```

*generates and sends*

*caches*

```
┌─────────────────────────────┐
│ Single Request 312          │
│                             │
│ ┌─────────────────────────┐ │
│ │ Sequence of Operations III│ │
│ └─────────────────────────┘ │
└─────────────────────────────┘
```

```
┌─────────────────┐
│ Name Caches 132 │
└─────────────────┘
```

*receives*

```
┌─────────────────────┐
│ Response from Server │
└─────────────────────┘
```

FIG. 3

400

```
┌──────────────┐                                    ┌──────────────┐
│  REQUEST     │          communicates              │  CACHING     │◄┄┄┐
│  COMPONENT   │───────────────────────────────────►│  COMPONENT   │   ┊
│  128         │                                    │  126         │   ┊
└──────┬───────┘                                    └──────┬───────┘   ┊
       │                                                   │           ┊
  executes                                             caching         ┊
       │                                                   │           ┊
       ▼                                                   ▼           ┊
┌──────────────┐                                    ┌──────────────┐   ┊
│ Name Cache   │                                    │              │   ┊
│ Lookup       │◄┄┄┄┄┄┄┄┄┄┄┄┄┄┄┄┄┄┄┄┄┄┄┄┄┄┄┄┄┄┄┄┄┄┄│ Name Cache   │   ┊
│ 303 at Client│                                    │     132      │   ┊
│ Computer     │                                    │              │   ┊
└──────┬───────┘                                    └──────────────┘   ┊
       │                                                               ┊
  generates                                                            ┊
  and sends                                                            ┊
       │                                                               ┊
       ▼                                                               ┊
┌──────────────────────┐                                              ┊
│                      │                                              ┊
│  Single Request 312  │                                              ┊
│  ┌────────────────┐  │                                              ┊
│  ┆Sequence of     ┆  │                                              ┊
│  ┆Operations III  ┆  │                                              ┊
│  └────────────────┘  │                                              ┊
└──────────┬───────────┘                                              ┊
           │                                                          ┊
       receives                                                       ┊
           │                                                          ┊
           ▼                                                          ┊
┌──────────────────┐                                                 ┊
│                  │                                                 ┊
│   Error 402      │┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┘
│                  │
└──────────────────┘
```

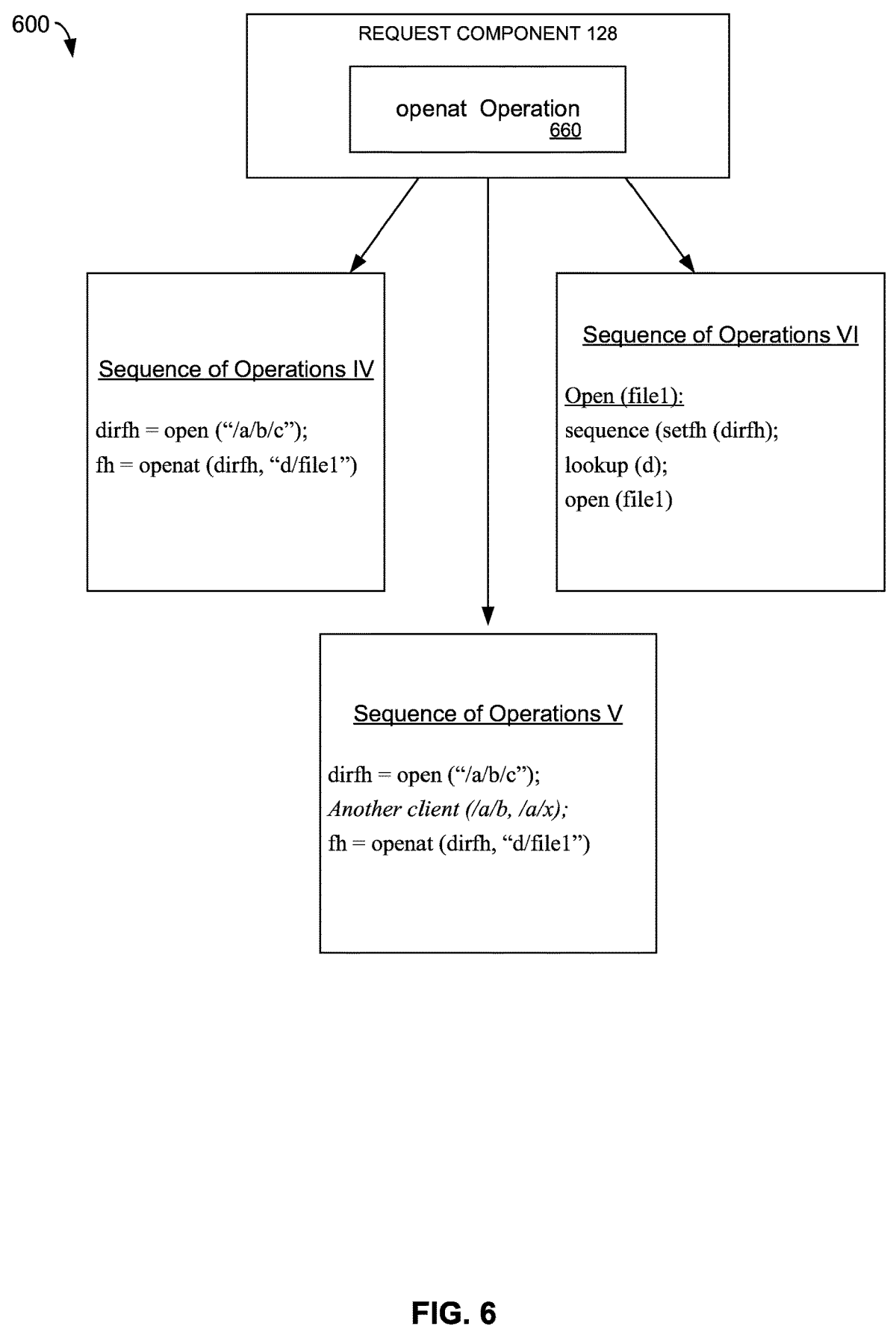

REQUEST COMPONENT 128 openat Operation
660

Sequence of Operations IV dirfh = open ("/a/b/c");
fh = openat (dirfh, "d/file1")

Sequence of Operations VI

Open (file1):
sequence (setfh (dirfh);
lookup (d);
open (file1)

Sequence of Operations V dirfh = open ("/a/b/c");
Another client (/a/b, /a/x);
fh = openat (dirfh, "d/file1")

FIG. 6

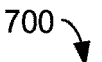
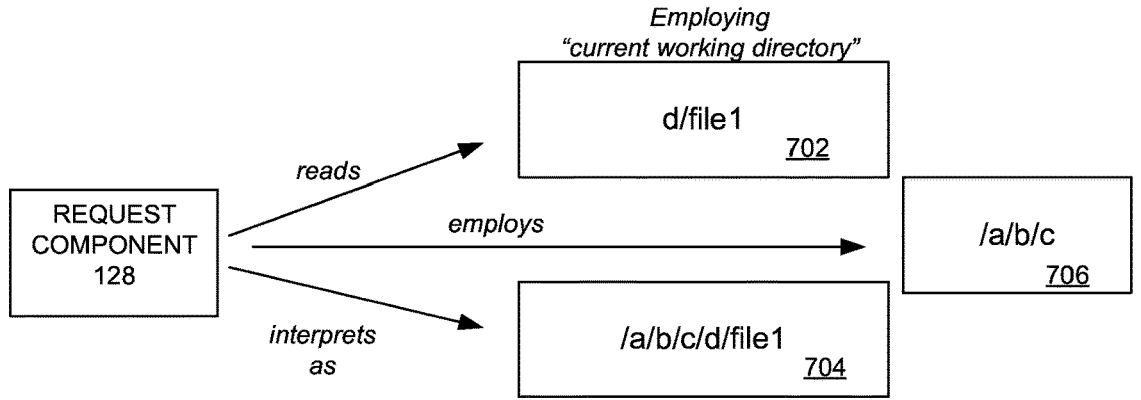
FIG. 7

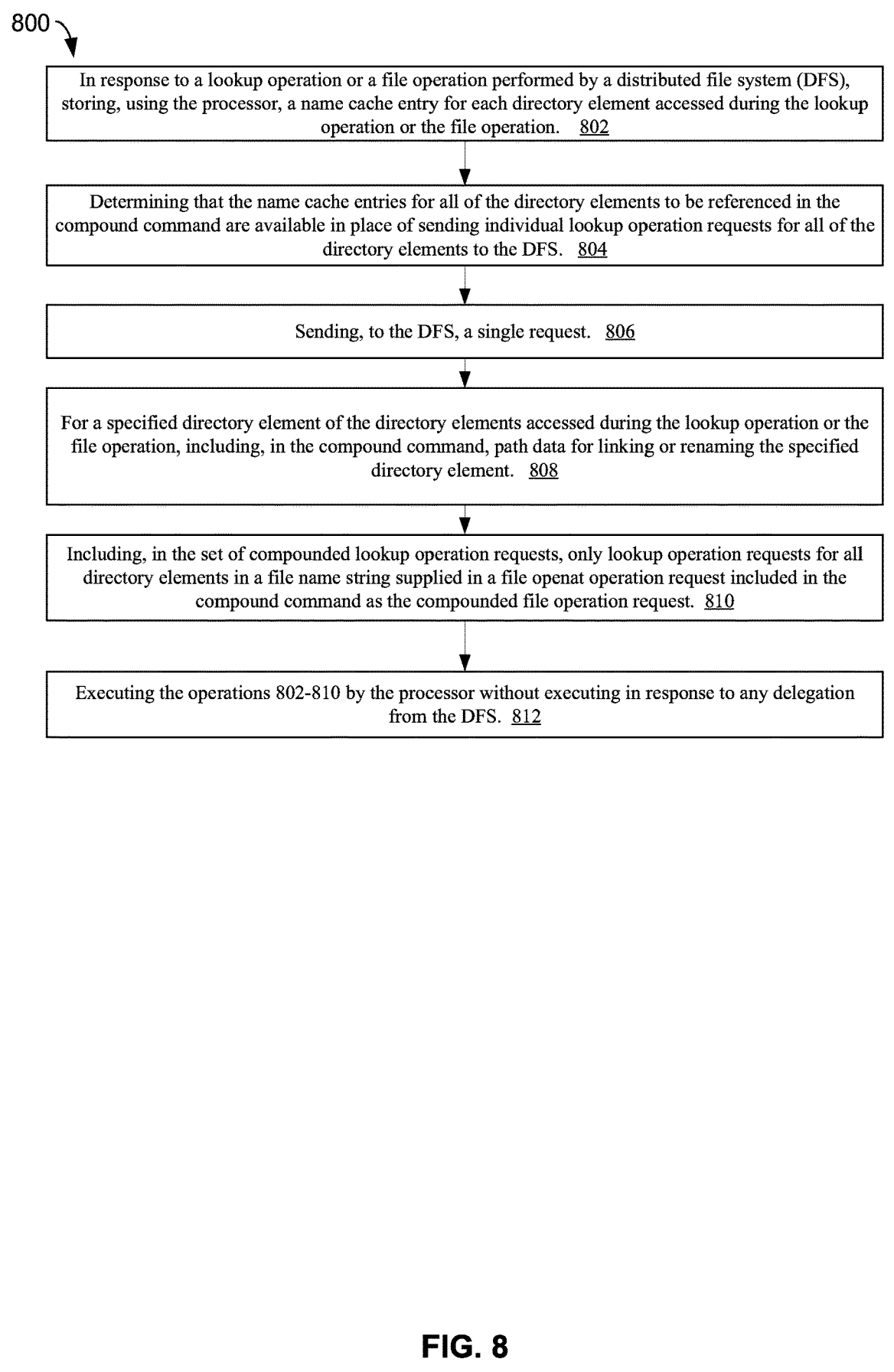

800

In response to a lookup operation or a file operation performed by a distributed file system (DFS), storing, using the processor, a name cache entry for each directory element accessed during the lookup operation or the file operation. __802__

Determining that the name cache entries for all of the directory elements to be referenced in the compound command are available in place of sending individual lookup operation requests for all of the directory elements to the DFS. __804__

Sending, to the DFS, a single request. __806__

For a specified directory element of the directory elements accessed during the lookup operation or the file operation, including, in the compound command, path data for linking or renaming the specified directory element. __808__

Including, in the set of compounded lookup operation requests, only lookup operation requests for all directory elements in a file name string supplied in a file openat operation request included in the compound command as the compounded file operation request. __810__

Executing the operations 802-810 by the processor without executing in response to any delegation from the DFS. __812__

FIG. 8

900

Generating, using a processor, a single comound command comprising lookup operation requests for a set of all directory elements along a file path from a file system root up to a file of interest, and further comprising a file operation request applicable to the file of interest. <u>902</u>

Performing, prior to the sending of the single compound command, a lookup operation by reading a name cache entry external to a distributed file system (DFS) for a directory element of the set of all directory elements along the file path. <u>904</u>

Performing lookup operations, using the processor, for all of the directory elements of the set of all directory elements prior to the sending of the single compound command, by reading a set of name cache entries, for the set of all directory elements, stored external to the DFS. <u>906</u>

Sending, using the processor, the single compound command to a distributed filesystem (DFS). <u>908</u>

In response to receiving a notification of failure to execute the single compound command from the DFS, deleting, using the processor, a name cache entry stored external to the DFS. <u>910</u>

In response to receiving a symbolic link from the NFS server as a result of execution of the single compound command, reading, using the processor, the symbolic link and caching, using the processor, a name of all directory elements of the symbolic link. <u>912</u>

In response to Operation 912, caching, using the processor, the name of all directory elements referenced in the symbolic link without directly caching the symbolic link. <u>914</u>

Sending the single compound command without also sending individual lookup operation requests. <u>916</u>

FIG. 9

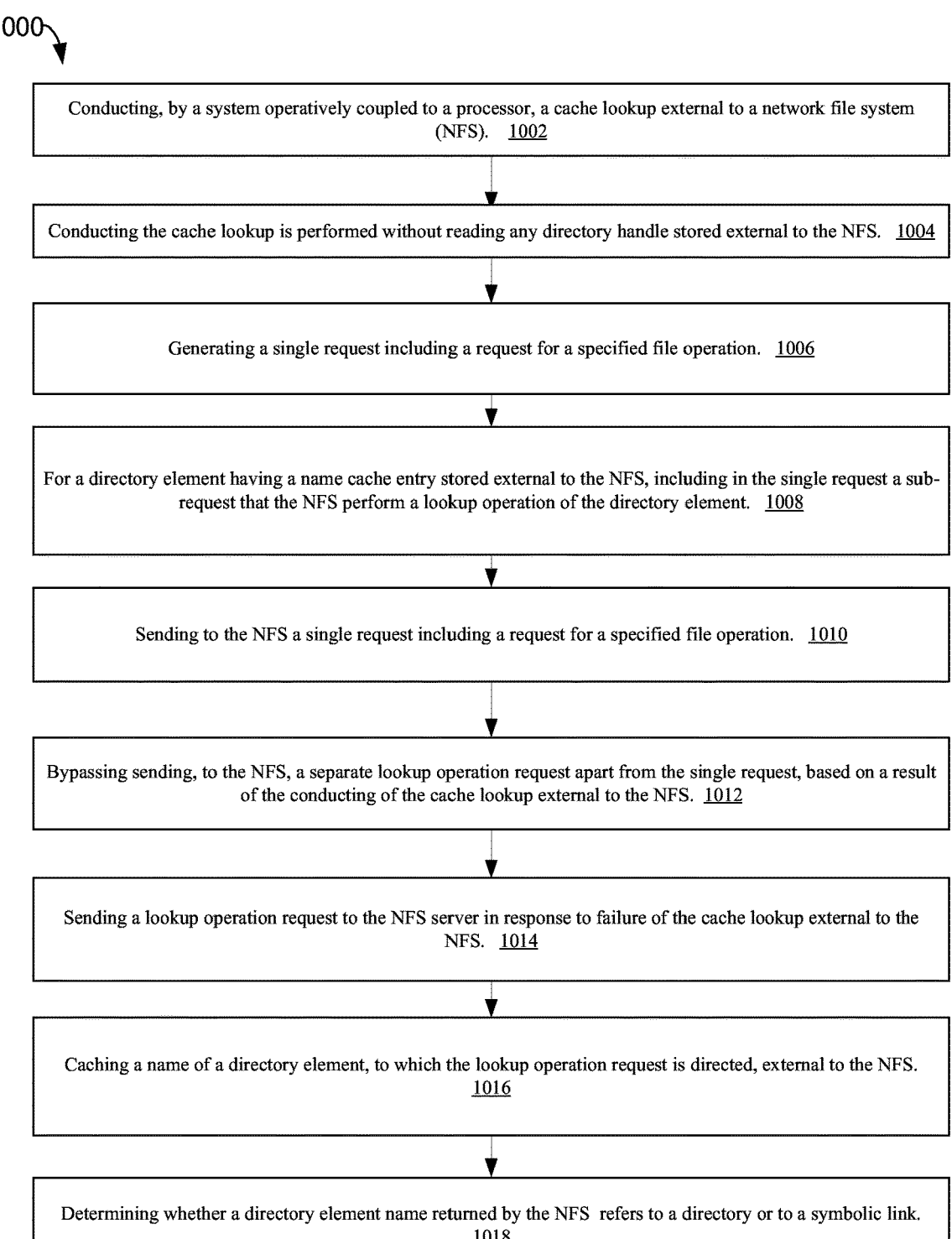

1000

Conducting, by a system operatively coupled to a processor, a cache lookup external to a network file system (NFS). 1002

Conducting the cache lookup is performed without reading any directory handle stored external to the NFS. 1004

Generating a single request including a request for a specified file operation. 1006

For a directory element having a name cache entry stored external to the NFS, including in the single request a sub-request that the NFS perform a lookup operation of the directory element. 1008

Sending to the NFS a single request including a request for a specified file operation. 1010

Bypassing sending, to the NFS, a separate lookup operation request apart from the single request, based on a result of the conducting of the cache lookup external to the NFS. 1012

Sending a lookup operation request to the NFS server in response to failure of the cache lookup external to the NFS. 1014

Caching a name of a directory element, to which the lookup operation request is directed, external to the NFS. 1016

Determining whether a directory element name returned by the NFS refers to a directory or to a symbolic link. 1018

FIG. 10

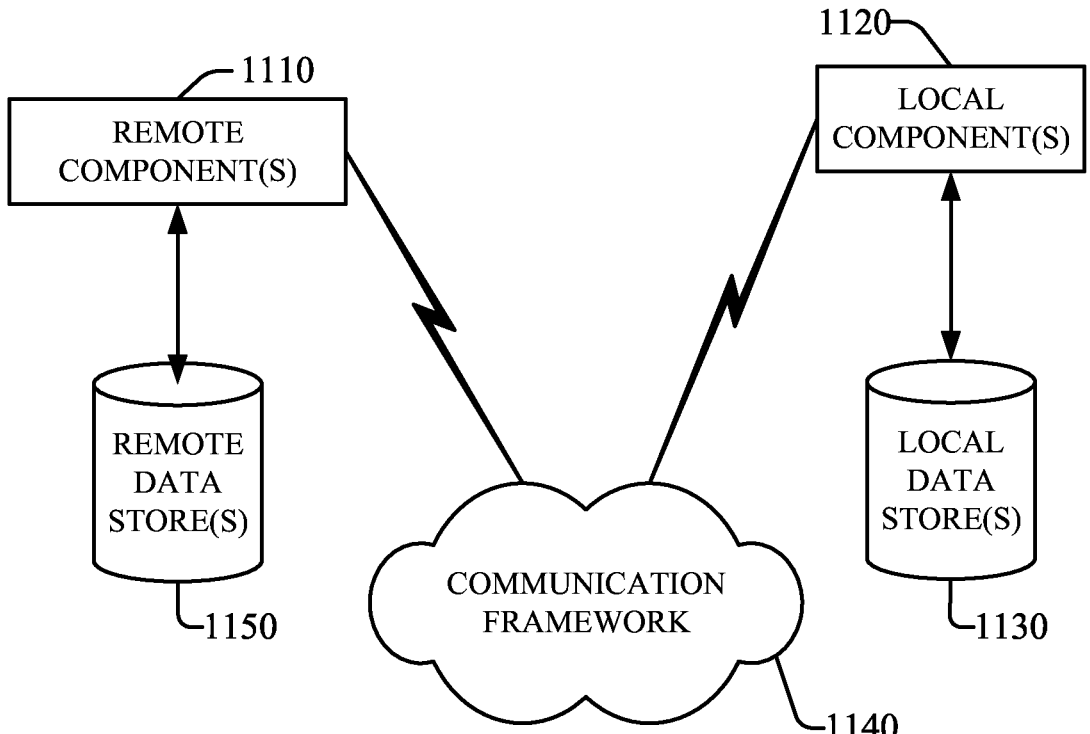
FIG. 11

1200

CLIENT-BASED NAME CACHE HANDLING EXTERNAL TO DISTRIBUTED STORAGE SYSTEM

BACKGROUND

A distributed storage system generally is a form of computer data storage that can provide remote data storage and access to one or more client computers. In this regard, multiple users or client computers can have access to the distributed storage system, and, where authorized, such users/client computers can view, add to, delete, or alter at least some of the data stored at the distributed storage system.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the one or more embodiments described herein in a streamlined form as a prelude to the more detailed description that is presented later.

An example system can comprise a processor and a memory that stores executable instructions that, when executed by the processor, facilitate performance of operations. The operations can comprise, in response to a lookup operation or a file operation performed by a distributed file system (DFS), storing, using the processor, a name cache entry for each directory element accessed during the lookup operation or the file operation. The operations further can comprise sending, to the DFS, a single request that comprises a compound command comprising requests for a set of compounded lookup operations of the lookup operations directed to any directory elements for which the name cache entries are stored, and a compounded file operation being the file operation.

An example of a method can comprise conducting, by a system operatively coupled to a processor, a cache lookup external to a network file system (NFS), sending to the NFS a single request including a request for a specified file operation, and bypassing sending, to the NFS, a separate lookup operation request apart from the single request, based on a result of the conducting of the cache lookup external to the NFS.

An example of a non-transitory computer-readable medium can comprise executable instructions that, when executed by a processor, facilitate performance of operations. The operations can comprise generating, using the processor, a single compound command comprising lookup operation requests for a set of all directory elements along a file path from a file system root up to a file of interest, and further comprising a file operation request applicable to the file of interest. The operations further can comprise sending, using the processor, the single compound command to a distributed filesystem (DFS).

BRIEF DESCRIPTION OF THE DRAWINGS

Numerous aspects, embodiments, objects, and advantages of the one or more embodiments described herein will be apparent upon consideration of the following detailed description, taken in conjunction with the accompanying drawings, in which like reference characters refer to like parts throughout, and in which:

FIG. 3 illustrates an example process flow for constructing and sending a DFS request, in accordance with one or more embodiments described herein;

FIG. 4 illustrates an example process flow for responding to a return response from the DFS server, in accordance with one or more embodiments described herein;

FIG. 6 illustrates an example process flow for constructing and sending an openat DFS request, in accordance with one or more embodiments described herein;

FIG. 7 illustrates an example process flow for addressing a "current working directory", in accordance with one or more embodiments described herein;

FIG. 8 illustrates various operations of an example process flow for employing name caching for generating a DFS request, in accordance with one or more embodiments described herein;

FIG. 9 illustrates various operations of another example process flow for employing name caching for generating a DFS request, in accordance with one or more embodiments described herein;

FIG. 10 illustrates various operations of yet another example process flow for employing name caching for generating a DFS request, in accordance with one or more embodiments described herein;

FIG. 11 illustrates a block diagram of an example computing environment into which one or more embodiments of the subject matter described herein can be incorporated;

DETAILED DESCRIPTION

Overview

Figure 1:
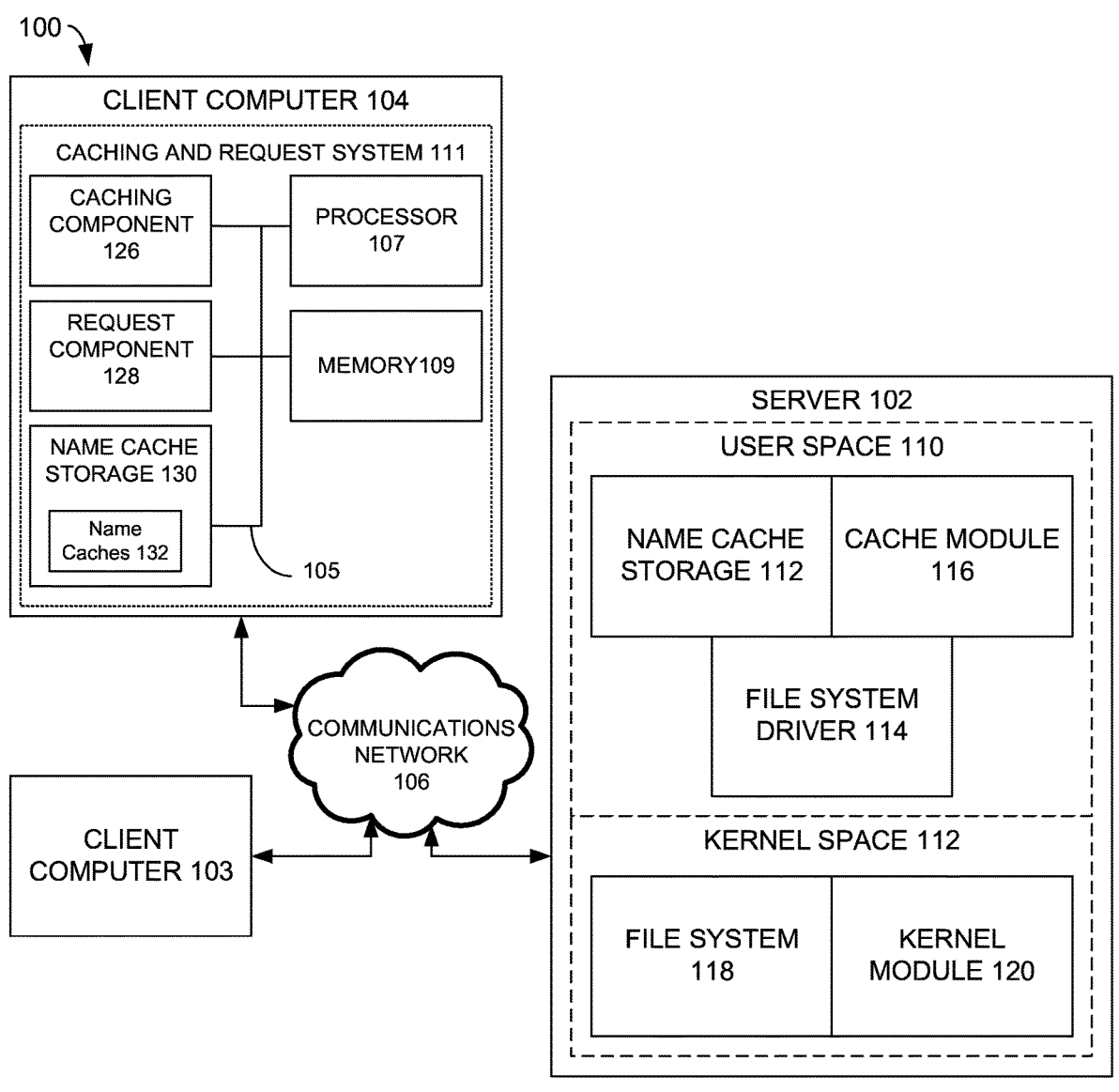
FIG. 1 illustrates a block diagram of an example system that can facilitate name cache storage and distributed file system requests, in accordance with one or more embodiments described herein.

One or more embodiments described herein relate generally to one or more techniques for name caching at a computers, and more specifically, to using the name caching for simplifying a file operation request submitted to a distributed storage system, such as an NFS filesystem.

As described herein, a distributed file system (DFS) can have an operating system. The operating system can provide updates to one or more remote computers about changes to files in the distributed file system, such as using an application-layer network protocol.

For using the DFS to perform open calls and/or other file operations, a plurality of requests can be requested by a client, such as based on a length of a file path from a root to a file of interest. A client can be a computer, server or other device accessing the DFS. In one example, a style of application programming interface (API) used in Linux and other operating systems, between a kernel core file handling that accepts portable operating system interface (POSIX) API requests and file system specific code that implements filesystems, such as NFS, can request a plurality of round trips between a DFS server and a client merely to perform a file operation.

For example, while entity application requests can be defined in terms of path names (e.g., a sequence of directory names separated by slashes and ending in a file name), an internal API from core to file system specific code can operate on single elements of the path individually. That is, separate actions can be performed per element.

For example, an application request open ("/a/b/c/d/file-name") can be expressed in a Linux kernel file system API as a Sequence of Operations I.

Sequence of Operations I:
1. handle1=handle1=lookup ("a", roothandle)
2. handle2=lookup ("b", handle1)
3. handle3=lookup ("c", handle2)
4. handle4=lookup ("d", handle3)
5. handle5=open ("filename", handle4)

There can be no explicitly stated relationship among the aforementioned five calls. That is, if several operations are handled in parallel, there often, relative to existing techniques, is no way for the DFS to determine which calls in the sequence the DFS receives are related to a particular path requested by the application. That is, requests are not guaranteed to be answered consecutively, and order of multiple requests from different clients or different requests from a same client or different clients can be mixed.

Because of this limitation, file system code, for example of a DFS client, can be forced to process each of these kernel API calls separately. If the DFS client is to request action from a DFS server, each individual API call can request a separate network round trip from the file system client, to the DFS, and back to the file system client. If no caching is employed, this multiple round trip overhead can be incurred on each POSIX operation that uses a path name, such as five round trips in the aforementioned example.

To avoid this high cost (e.g., in terms of time, processing power, energy, memory and/or the like), clients can implement name caches, in which the result of lookup operations can be held within the client. A name cache is a cache in which the client keeps track of the names of directories and files and the file handles to which the names refer. In the example above, the results of operations 1 through 4 of the Sequence of Operations I would be cached. This means that a subsequent application request to operate on/a/b/c/d/file2 would require only a single NFS action on file2 relative to the directory identified by handle4, and thus only a single round trip to the server.

However, relative to the name caching, continually determining that a name cache is valid can be an issue. Timers and/or periodic checking for directory change is used in existing techniques.

In one example, a cache can be retained for a specific time period, such as 30 seconds. In one example, each cache can be reverified every time a time period elapses. This continuous operation can employ substantial resources.

As used herein, the term "resource" can refer to power, money, memory, processing power and/or the like.

In another example, when a time period has elapsed, for each cache, when a client looks to reference the cached name, only then will the client send a lookup operation and verify with the DFS that a cache entry remains validated.

Unfortunately, before the time period elapses, a cache entry can be referenced and or attempted to be used, even if the cache entry is invalid, because a verification will not be performed until the time period elapses.

In one or more other embodiments, the distributed file system can delegate one or more operations to a client, such as to permit the client, under specific constraints, to cache certain global file system states maintained by a server of the DFS. The client can ask for delegation for each directory that is desired to be cached by the client. The server of the DFS can, but is not always required to, grant the respective requests. If granted, the client is permitted, until directed otherwise, to cache the particular entries.

It will be appreciated that requests of the client, and/or other actions of the client, can be facilitated by and/or be those of an administrating entity or user entity, for example.

As used herein, the term "entity" can refer to a machine, device, smart device, component, hardware, software and/or human.

For example, by rules of one existing technique, for a client to cache the results of operations 1-4 above, it is required to hold at that time a directory delegation on the root directory, and on directories a, b, and c.

When the DFS server, such as NFS server, has granted a delegation, any change made to that directory can trigger either a recall (revocation) of the delegation or a notification to clients holding that delegation stating what specifically changed (that is, if the client requests such additional information and the server grants the notification request). The clients then can discard the affected entries, such as employing a related processor. If there are many clients that do name caching, each can hold the relevant delegations, meaning that any directory change can employ a 1 to N broadcast of the recall or notification operation. This explicit handling of caching permission and cache change can deliver a coherent distributed cache, but at a significant cost.

As used herein, the term "cost" can refer to power, money, memory, processing power and/or the like.

Indeed, this broadcast nature can mean that in environments with large numbers of clients, it can take only a small directory change rate to generate a substantial broadcast burden. Accordingly, directory delegation can be a complex feature for both server and client. Furthermore, relative to some DFS's delegation can be non-used, or cannot be used for one reason or another. Accordingly, in such cases, for correct operation when a file system is shared and rapidly modified by many clients, it can be requested to build a name caching solution that deals with the coherence problem. A full implementation of directory delegation conforming the particular DFS can be an expensive and costly solution.

To account for one or more deficiencies describe above, one or more embodiments of systems, methods and/or non-transitory machine-readable mediums described herein can implement a name caching technique and employ the name caching for reducing complexity, and thus cost, of calls to a DFS, such as an NFS.

Generally, the one or more embodiments can perform name caching for directory entries of interest and can employ the name caching entries in place of individual lookup operations, such as the operations 1-4 of the aforementioned Sequence of Operations I. In addition, a single request can be generated and sent to the DFS to facilitate a call operation or other file operation, including but not limited to a file link operation, file rename operation, file open operation, or file unlink operation. Accordingly, a single request can be generated and sent, and thus a single return communication can be received relative to the request from the DFS. The single request can carry a full file path relative to a file of interest of the file operation being requested. Where the single return communication includes an error, such as a path unavailable error, the return communication can be analyzed to determine where the error occurred, and individual lookup operations can be requested to the DFS to update one or more name cache entries.

That is, where name cache entries are valid and consistent with a state of the DFS, some use of the DFS can be avoided. Indeed, the typical lookup operations for directory elements can be satisfied employing the name caching external to the DFS. This is because an assumption is made by the one or more embodiments that the name cache entries external to the DFS are valid, until such time that a single (e.g., compile) request for a file operation is generated and sent to a DFS. In this way, multiple round trips to and from the DFS can be omitted. Delegation is not requested. In cases where delegation cannot be requested or is not granted, development of a specific client-based delegation tool can be avoided.

Example Architecture

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 1300 illustrated at FIG. 13. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, an example of a system architecture is illustrated at 100, with description being provided below. While referring here to one or more processes, operations, facilitations and/or uses of the non-limiting system architecture 100, it will be appreciated that description provided herein, both above and below, also can be relevant to one or more other non-limiting system architectures described herein.

The non-limiting system architecture 100 can facilitate a path name cache and/or API call. Non-limiting system architecture 100 can comprise a server 102, client computer 104, client computer 103 and communications network 106.

Communications network 106 can comprise a computer communications network, such as the Internet. In one or more other embodiments, communications to or from the communications network 106 can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLU-ETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Figure 12:
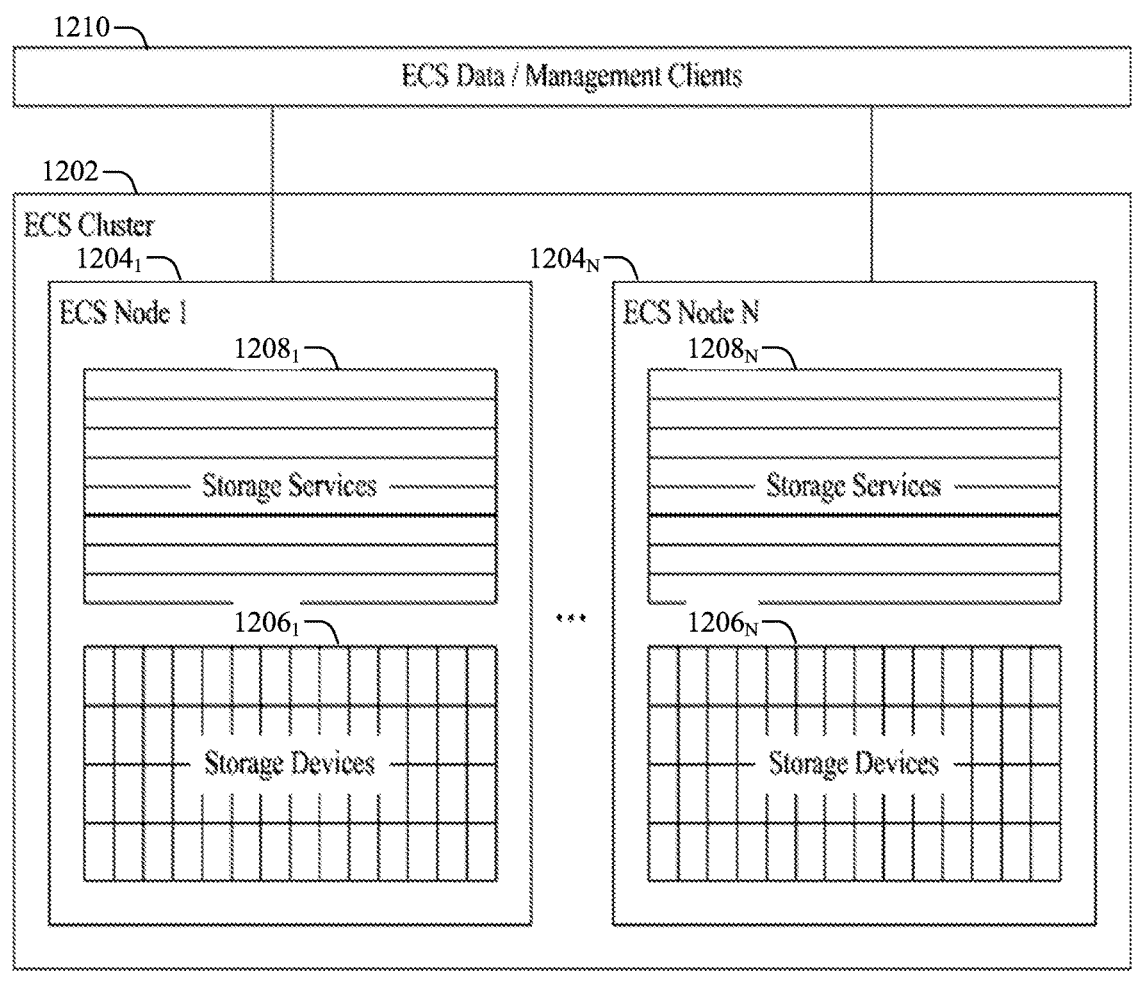
FIG. 12 illustrates a block diagram of an example distributed file storage system that employs tiered cloud storage in accordance with one or more embodiments described herein.
Figure 13:
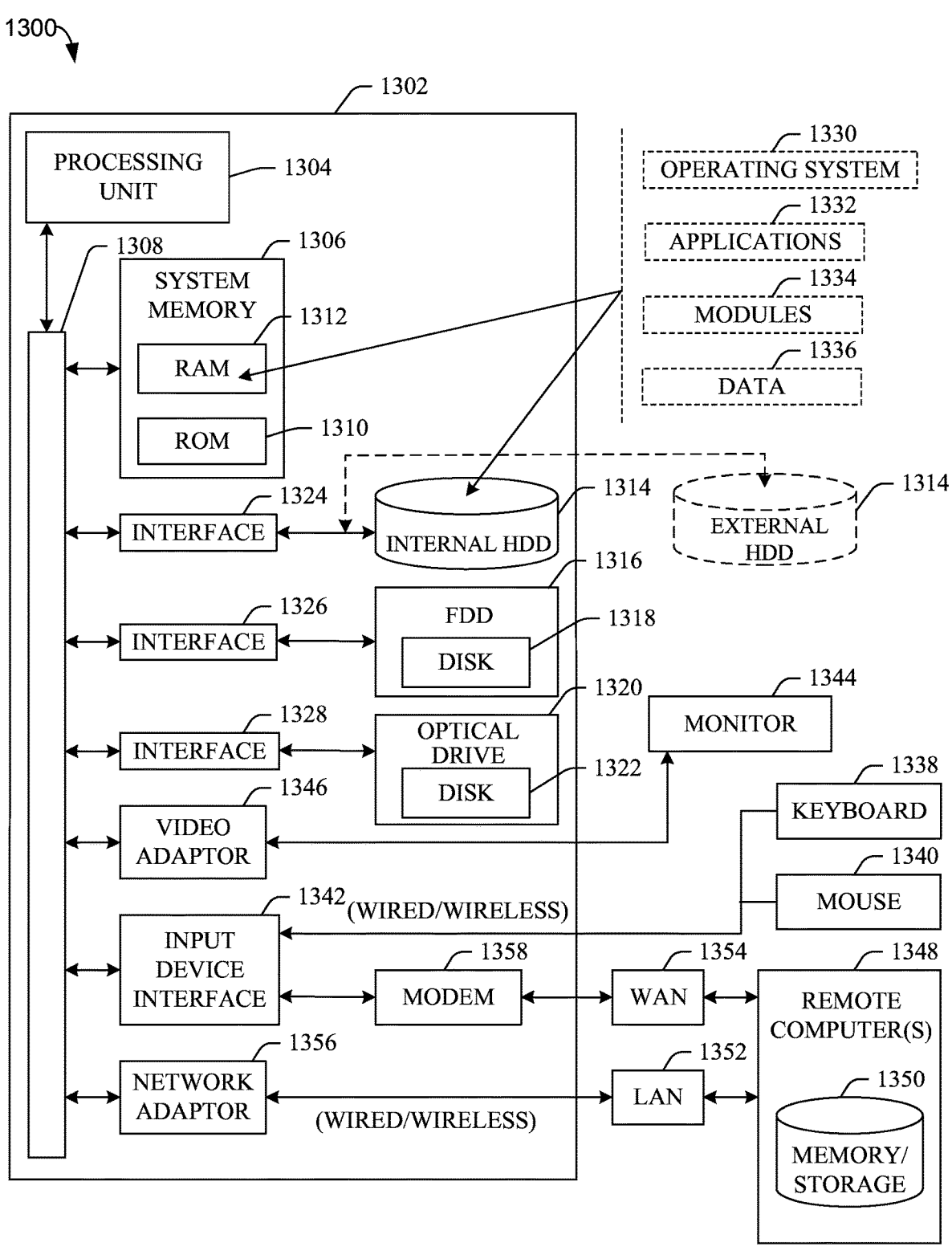
FIG. 13 illustrates an example schematic block diagram of a computing environment with which the subject matter described herein can interact and/or be implemented at least in part, in accordance with one or more embodiments and/or implementations described herein.

Server 102 can be implemented using aspects of distributed file storage system 1200 of FIG. 12 and computer 1302 of FIG. 13. It can be appreciated that server 102 is presented logically, and that there can be embodiments where server 102 comprises multiple computers. In one or more examples, server 102 can implement NFS standards and/or be compatible with Linux and/or Unix operating systems.

As depicted, server 102 can comprise user space 108, kernel space 110, name cache storage 112, file system driver 114, cache-aware change notify module 116, file system 118, and kernel process 120.

User space 108 can generally be a portion of system memory of server 102 in which user processes run.

Kernel space 110 can generally be a portion of system memory of server 102 in which kernel processes run.

Name cache storage 112 can comprise a cache that stores LINs (which serve as a key to the cache) and corresponding path names for a file or directory.

File system driver 114 can comprise a computer device driver that provides access to a file system (in which files and or directories for which change notify responses can be produced can be stored) of server 102 to one or more applications or modules of server 102, such as cache module 116.

Cache module 116 can generate and send change notify responses to client computer 104 and/or client computer 103.

File system 118 can comprise an organization of data on server 102 into one or more files and/or directories that can contain files.

Kernel module 120 can provide some operating system functions for server 102, such as file management and resource allocation. Kernel process 120 can be responsible for receiving file change events and implementing those events (e.g., deleting a file).

Server 102 can store and maintain one or more computer files, which can, in turn, be accessed by client computer 104 and/or client computer 103. Client computer 104 and/or client computer 103 can access these files on server 102 via a server message block (SM)B protocol.

In one or more examples, cache module 116 can determine that such a file modification has been made or will be made, and can generate and issue a change notify response accordingly. Server 102 can send client computer 104 and/or client computer 103 a change notify response when one or more particular files or directories are changed on server 102 (e.g., when the file or directory is generated, modified, renamed, or deleted). However, as indicated above, this can be a resource-intensive broadcast system. Accordingly, reference is now turned to the client computers 104 and 103.

Client computer 104 and/or client computer 103 can be a workstation, a server computer, a router, a personal computer, portable computer, a peer device and/or other common network node. Client computer 104 and/or client computer 103 can be implemented using aspects of computer 1302 of FIG. 13.

As depicted, client computer 104 comprises a processor 107, memory 109, bus 105, caching component 126, request component 128 and name cache storage 130. It will be appreciated that client computer 103 also can comprise similar or same components. However, discussion now will be directed only to client computer 104, with the understanding that features, process, elements, abilities and/or the like described relative to client computer 104 also can be applied to client computer 103 in one or more embodiments. In one or more embodiments, the processor 107, memory 109, bus 105, caching component 126, request component 128 and/or name cache storage 130 can be referred to as a caching and request system 111.

Caching component 126 can direct name caches 132 to be generated and stored, such as at name cache storage 130. For example, caching component 126 can obtain a path, such as a file path, for a file of interest and can walk through the path to pick up directory elements in the path. A name cache 132 can be generated, by the caching component 126, for each directory element in the path.

It will be appreciated that although name cache storage 130 is shown internal to the client computer 104, the name cache storage 130 can be external to the client computer 104 in one or more other embodiments. Indeed, name cache storage 130 can be any suitable storage for storing name caches 132 or can be included as a portion or partition of another storage.

Request component 128 can generate one or more requests relative to the file system 118. Request component 128 also can send the one or more requests to the server 102.

Further, prior to sending a request, request component 128 also can employ, such as read, one or more name caches 132 stored at the name cache storage 130. That is the name caches 132 can be employed as an alternative to sending separate lookup operations to the server 102.

In response to determining that the name caches exist for any directory element in the file path (e.g., from root to file of interest) for the file of interest, the request component 128 can generate a single request comprising a single compound command. The single compound command can include a set of one or more lookup operation requests and a file operation request for the file of interest. The file operation being requested can be a file link operation, file rename operation, file open operation or file unlink operation, among others.

The processor 107 can facilitate receipt of a response from the server 102. The response can be a result of execution of the file operation for the file of interest. A response alternatively can be a path unavailable error or other error.

It will be appreciated that the aforementioned functions of the caching component 126 and request component 128, in addition to one or more operations performed by the client computer 104 in response to receiving a response from the server 102, will be described in greater detail below with respect to processes 200-700 of FIGS. 2-7, respectively.

Discussion turns first briefly to the processor 107, memory 109 and bus 105 of the client computer 104.

For example, in one or more embodiments, client computer 104 can comprise a processor 107 (e.g., computer processing unit, microprocessor, classical processor and/or like processor). In one or more embodiments, a component associated with client computer 104, as described herein with or without reference to the one or more figures of the one or more embodiments, can comprise one or more computer and/or machine readable, writable and/or executable components and/or instructions that can be executed by processor 107 to facilitate performance of one or more processes defined by such component(s) and/or instruction (s). In one or more embodiments, the processor 107 can comprise the caching component 126 and/or request component 128.

In one or more embodiments, the client computer 104 can comprise a machine-readable memory 109 that can be operably connected to the processor 107. The memory 109 can store computer-executable instructions that, upon execution by the processor 107, can cause the processor 107 and/or one or more other components of the client computer 104 (e.g., the caching component 126 and/or request component 128) to perform one or more actions. In one or more embodiments, the memory 109 can store computer-executable components (e.g., the caching component 126 and/or request component 128).

Client computer 104 and/or a component thereof as described herein, can be communicatively, electrically, operatively, optically and/or otherwise coupled to one another via a bus 105 to perform functions of non-limiting system architecture 100, client computer 104 and/or one or more components thereof and/or coupled therewith. Bus 105 can comprise one or more of a memory bus, memory controller, peripheral bus, external bus, local bus and/or another type of bus that can employ one or more bus architectures. One or more of these examples of bus 105 can be employed to implement one or more embodiments described herein.

In one or more embodiments, client computer 104 can be coupled (e.g., communicatively, electrically, operatively, optically and/or like function) to one or more external systems (e.g., a system management application), sources and/or devices (e.g., classical communication devices and/or like devices), such as via a network, such as to the server 102. In one or more embodiments, one or more of the components of the non-limiting system architecture 100 can reside in the cloud, and/or can reside locally in a local computing environment (e.g., at a specified location(s)).

In addition to the processor 107 and/or memory 109 described above, client computer 104 can comprise one or more computer and/or machine readable, writable and/or executable components and/or instructions that, when executed by processor 107, can facilitate performance of one or more operations defined by such component(s) and/or instruction(s).

Further, it will be appreciated that the client computer 104, like the server 102, can include both a kernel space and a user space. For example, a user space of the client computer 104 can include one or more of the name cache storage 130, caching component 126 and/or respective file system driver. A kernel space of the client computer 104 can include, for example, the processor 107, memory 109, request component 128, a respective file system and/or a respective kernel module. In one or more other embodiments, distribution of components can be different.

Example Processes

Turning now to FIGS. 2-7, various processes are illustrated as can be performed and/or executed by the system architecture 100, including the server 102 and the client computer 104. The processes illustrated include name caching (FIG. 2), constructing and sending a single request (FIG. 3), addressing an error as a response from the server 102

(FIG. 4), addressing a symbolic link returned by the server 102 (FIG. 5), constructing and sending a single request including an openat file operation (FIG. 6), and handling of a "current working directory" by the client computer 104 (FIG. 7). Repetitive description of like elements and/or processes employed in respective embodiments is omitted for sake of brevity.

Figure 2:
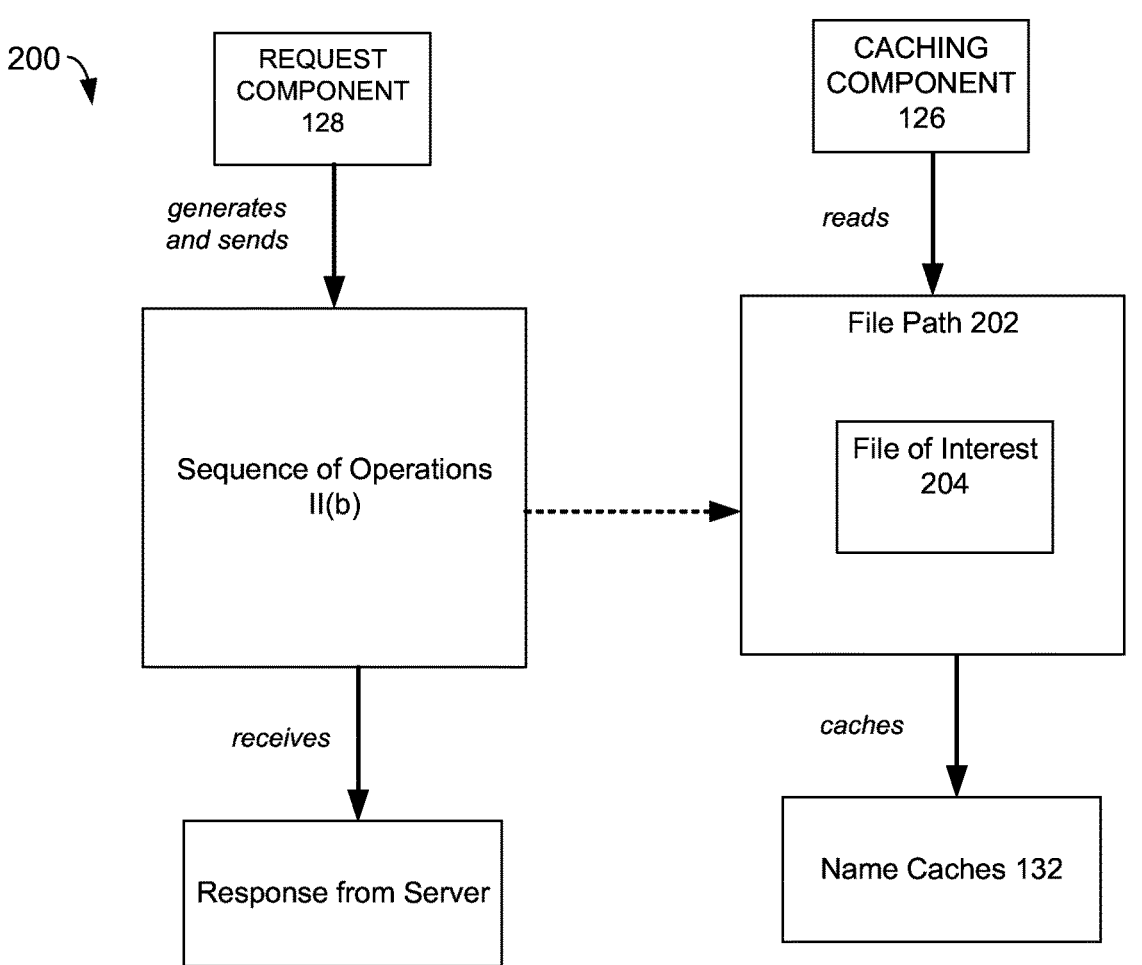
FIG. 2 illustrates an example process flow for name caching at a client computer, in accordance with one or more embodiments described herein.

Looking first to FIG. 2, process 200 includes operations for name caching names of one or more directory elements of the file system 118 of the server 102 external to the server 102, such as at the client computer 104. As indicated above, the caching component 126 can read a file path 202 for a file of interest 204. That file path can include all directory elements 206 along the path from the root to the file of interest 204. The caching component 126 then can cache, such as at the name cache storage 130, the names of any and/or all of the directory elements 206. In one or more embodiments, a name cache entry 132 can include a reference to a name cache entry of a parent directory element of a respective directory element to which the respective name cache entry 132 refers. It will be appreciated that no directory handles are employed for generating name caches 132.

If not completed before the name caching of the directory elements 206, the request component 128 can generate and send to the server 102 separate lookup operation requests 210 for each of the directory elements 206.

For example, a Sequence of Operations II can be sent. Sequence of Operations II:
   a. lookup (a)→sequence (setfh (root); lookup (a))
   b. lookup (b)→sequence (setfh (a); lookup (b))
   c. lookup (c)→sequence (setfh (b); lookup (c))
   d. lookup (d)→sequence (setfh (c); lookup (d))

That is, for any directory element included in and/or referenced by a lookup operation or file operation not previously requested of the server 102, or for any known invalid name cache external to the server 102 (and thus used by the client computer 104), a lookup operation is to be requested. In view of responses from the server 102 for those lookup operations being returned as non-error responses, the client computer 104, such as via the processor 107 or request component 128, can determine that the directory elements exist as named. The caching component 126 can then be directed, such as by the processor 107 or by the request component 128, to cache the names (e.g., and types—directory, file, symbolic link) as the name caches 132.

However, turning next to FIG. 3, once the name caches 132 are generated and stored, the client computer 104 can operate on an assumption that the name caches 132 are valid, until such time that an error, such as a path unavailable error, is returned in or as a response from the server 102.

Accordingly, FIG. 3 illustrates a process 300 comprising operations for executing another file operation having name caches 132 already cached for all directory elements along a file path of a second file of interest 302 of the file operation being requested. That is, process 300 comprises operations for constructing (e.g., generating) and sending a single request 312 comprising a single compound command to the server 102.

By employing the name caches 132 (e.g., reading the name caches 132 by the request component 128) for a name cache lookup 303, the client computer 104 can perform lookup operations, the results of which are typically requested to be sent to the server 102. That is, for a file of interest 302 for which name caches are already cached (e.g., of the directory elements along a file path from a root to the file of interest 302), sending of one or more request for lookup operations to the server 102 can be avoided. In this way, one or more round trips to and from the server 102 can be avoided, using less resources at the server 102. Additionally and/or alternatively, resources used by the client computer 104 to lookup name caches can be less than that for generating and sending lookup operation requests and further receiving and analyzing/addressing responses returned from a server.

It will be appreciated that if an error or issue occurs relative to the reading of the respective name caches 132 by the client computer 104, one or more lookup operations (e.g., only for those directory elements for name caches 132 of error or issue) can be requested of the server 102, such as by the request component 132, to thereby allow for re-caching or newly-caching one or more name caches 132.

Upon employing the name caches 132, and accordingly determining/verifying one or more directory elements 206, the request component 128 can generated a single request 312. The single request 312 can comprise a single compound command 313 including requests for a set of lookup operations 314 and for a file operation 316. That is, the intent can be to send a single request, for the server to process a single request, although including multiple parts, and to receive a single response back form the server. See, for example, a Sequence of Operations III including only a single request 312.

Sequence of Operations III:
   a. lookup (a)→
   b. lookup (b)→
   c. lookup (c)→
   d. lookup (d)→
   e. open (file2)→sequence (setfh (root); lookup (a); lookup (b); lookup (c); lookup (d); open (file2))

It is noted that steps a through d of the Sequence of Operations III produce no DFS server requests. Rather, the client, e.g., the client computer, can reply directly to the kernel API using the cache directory (e.g., name cache storage 130). Individual lookup operation requests are not sent to the server 102, completed in a non-consecutive order, or mixed with operation requests for other files of interest or from other clients. Furthermore, no directory handles are employed for generating the single request 312.

Indeed, where each of the path elements (e.g., directory elements) at the file system 118 are valid, a response of execution of the file operation 316 requested can be returned by the server 102. Validity can be based upon each of the directory elements existing at the server 102 or another server accessed by the server 102.

Turning to FIG. 4, alternatively, an error 402 can instead be returned from the server 102, such as a path unavailable error. FIG. 4 illustrates a process 400 comprising operations for addressing a failed single request, such as due to a returned error 402.

Where the error 402 is for the final operation (e.g., "open"), the error 402 can be reported to the respective application. Where the error 402 is an error on one of the lookup operations, the error 402 can be "name does not exist" or "not a directory", for example. The application request thus would be rejected in that the server 102 would have identified that the supplied path string is not valid, and thus the application's request is in error. Accordingly, the stored name cache 132 can effectively be rendered invalid via the path unavailable error 402. In such case, the caching component 126 can delete one or more respective invalid name caches 132, such as in view of one or more communications from the request component 128.

Figure 5:
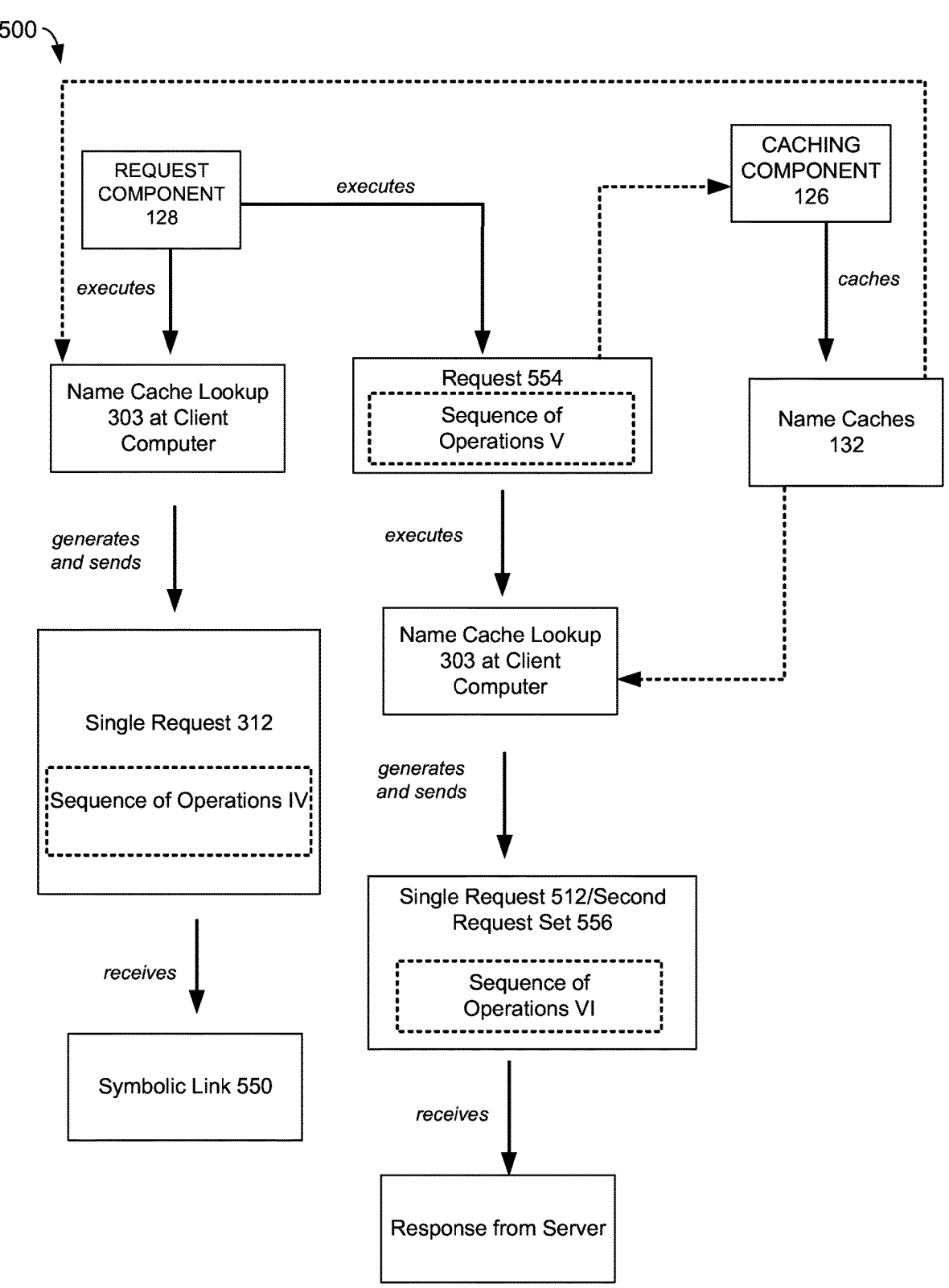
FIG. 5 illustrates an example process flow for managing a symbolic link with respect to a DFS request, in accordance with one or more embodiments described herein.

Turning now to FIG. 5, illustrated is a process 500 comprising operations for addressing a returned symbolic link 550 from the server 102. In the case that a single request 312 results in a response from the server 102 including a symbolic link 550, the caching and request system 111 can address the symbolic link 550. For example, the caching component 126 can read the symbolic link, but the value read is not cached. That is, it will be appreciated that when requesting lookup operations and generating and storing name caches for directory elements from the symbolic link 550, the symbolic link 550 itself is not cached, such as by the caching component 126.

The resulting new path is then processed in accordance with the process 200, for example. That is, paths that contain symbolic links are cached to the extent the path elements (e.g., directory elements) are directories. Directory elements 556 of the path of the symbolic link 550 are cached by the caching component 126.

For example, if an application supplies a long path name of which a final element is a symbolic link that itself contains a long path pointing to an actual file of interest to be operated on, all of the directory names of the directory elements given by the application, and all the directory names of the directory elements in the symbolic links, will be cached, such as by the caching component 126. However, the symbolic links themselves and the final file of interest will not be cached.

As a result, a later file operation request on that same application-supplied path string can involve a total of two server requests to be generated and sent, such as by the request component 128. A first readlink request 554 (Sequence of Operations V) can be to re-read the symbolic link by the server 102. A second open request set 556 (Sequence of Operations VI) can be to operate on the actual file, such as comprising a respective single request 512.

For example, an application can initially execute the follow Sequence of Operations IV:

a. sequence (setfh (root), lookup (a))
 b. sequence (setfh (a), lookup (b))
 c. sequence (setfh (b), lookup (c))
 d. sequence (setfh (c), lookup (d))
 e. sequence (setfh (root), lookup (a), lookup (b), lookup (c), lookup (d), open (link))

The server 102 will reject the operation e of the Sequence of Operations IV, indicating a symbolic link. In response, the client computer 104 can, employing the caching component 126, perform the following Sequence of Operations V:

sequence (setfh (root), lookup (a), lookup (b), lookup (c), lookup (d), readlink (link)).

Performing this operation of Sequence of Operations V can provide a new path comprising one or more updated and/or new name caches via the caching component 126, which can then be followed via a second set of operations, Sequence of Operations VI:

f. sequence (setfh (root), lookup (e))
 g. sequence (setfh (e), lookup (f))
 h. sequence (setfh (f), lookup (g))
 i. sequence (setfh (root), lookup (e), lookup (f), lookup (g), open (file)).

In addition, if later on the same open request is made, operations a to d of Sequence of Operations IV can be instead answered by the client name cache, employing caching component 126. Indeed, in view of the operation of Sequence of Operations V employing the caching component 126, the later answering of operations a to d of Sequence of Operations IV can inform the client computer 104 that the respective path is a link. Accordingly, operation e of Sequence of Operations IV can be skipped later on, and operations can proceed directly to the Sequence of Operations V. Again, it is noted that the symbolic link itself is not cached.

Symbolic links also can supply part of a path but not all the way to the final name. Suppose "link" contains /e/f/g, and the application does open (/a/b/c/d/link/file). The result is that the operation e of Sequence of Operations IV above would become: sequence (setfh (d), lookup (link)). If the server 102 is requested for the file type as part of the lookup request, the answer can tell us that "link" is a symbolic link. If not, a next step (e.g., operation e-2) would be: sequence (setfh (link), open (file)) which would fail with an error indicating that "link" is not a directory but rather a symbolic link, thus prompting the Sequence of Operations V.

Turning now to FIG. 6, illustrated is a process 600 comprising operations for requesting a single request 612 including a request for a file openat operation 660 from the server 102.

In one or more embodiments, a portable operating system interface (POSIX) can support a variation of the regular "open" request called "openat". The openat operation can use a file handle obtained by a previous call that opened a directory. That is, in the case of an openat operation 660, a file handle can be employed by the caching and request system 111 for sending a single request 612 including a request for the openat operation 660 to the server 102. The file handle can be supplied as a starting point of the path traversal to a respective file of interest 606.

For example, suppose an application executes the following Sequence of Operations VII:

dirfh=open ("/a/b/c"); and
 fh=openat (dirfh, "d/file1").

The execution of the Sequence of Operations VII can be similar to a regular open call ("/a/b/c/d/file1") as discussed above, such as relative to the Sequence of Operations I. However, a difference can be that the directory file handle obtained in an initial lookup operation can be to a given directory and can continue to refer to that same directory even if a name of that same directory is subsequently changed.

For example, suppose the following Sequence of Operations VIII:

dirfh=open ("/a/b/c");
 another client does rename ("/a/b", "/a/x"); and
 fh=openat (dirfh, "d/file1").

The effect of execution of the Sequence of Operations VIII can be as if the application had executed open ("/a/x/c/d/file1"). This is because, with reference to the Sequence of Operations I, after step b, the directory referenced by "dirfh" is now named /a/x/c. Indeed, the handle can remain valid even the path leading up to the directory is renamed.

A solution for this case can rely on that an OS kernel, such as a Linux kernel, passing to the individual file operation functions a data structure called a "path" which can be a linked list of elements, one for each name in the specified path, in reverse order. For a regular "open" call, a respective path structure can end with a name element for a respective file system root. However, for an "openat" operation 660, a respective path structure can end with a directory object having a file handle of which was specified in the request.

As a result, a client computer (e.g., client computer 104) using the subject embodiments can then issue a final Sequence of Operations IX:

open (file1)→
 sequence (setfh (dirfh);
 lookup (d); and
 open (file1).

This Sequence of Operations IX can result in the correct file being opened, and the correct path name elements being checked (namely "d") whether or not the directory opened as "dirfh" has been renamed since it was opened or not, in accordance with the one or more embodiments discussed above. That is, the path name elements validated in accordance with the above embodiments can be the path elements in the file name string supplied in the "openat" operation 660 request only.

It will be appreciated that there can be various other "at" type operations, such as "renameat", where a same general process (e.g., similar to process 600) can be employed.

Turning now to FIG. 7, illustrated is a process 700 comprising operations for handling a "current work directory" by the system architecture 100, and employing the client computer 104, and thus employing a caching and request system thereof.

In one or more embodiments, an OS, such as Unix, can use a concept of a "current working directory" which is the implied path prefix for any file operation that does not begin with a "I" character. For example, open ("d/file1") is an open relative to the current working directory.

Unlike the case of "open at" discussed above relative to FIG. 6, "current working directory" is not an open directory but rather in effect a stored string. Suppose, for example, that the current working directory 706 is "/a/b/c". Accordingly, operation 702 ("d/file1") can be equivalent to open operation 704 ("/a/b/c/d/file1"), interpreted, such as by the request component 128 according to the directory names as presently cached or as existing at the file system 118.

In another embodiment, an OS, such as Linux, also can use a concept of a "current working directory". A path relative to the current working directory can be handled internally by constructing a path data structure, such as a linked list, that links to the path (linked list) representing the current working directory. As a result, what the individual file operations encounter is a full path from the file system root.

Example Process Flows

Turning next to FIGS. 8 to 10, process flows of processes 800, 900 and 1000 are illustrated. Each of the processes 800, 900 and 1000 can comprise one or more of the processes 200, 300, 400, 500, 600 and 700 described above. The processes are illustrated as can be performed and/or executed by the system architecture 100, including the server 102 and the client computer 104. Accordingly, repetitive description of like elements and/or processes employed in respective embodiments is omitted for sake of brevity.

FIG. 8 summarizes various example operations, e.g., corresponding various operations of a process 800 that can manage requesting a file operation at a file server. Repetitive description of like elements and/or processes employed in respective embodiments is omitted for sake of brevity.

Operation 802 can comprise, in response to a lookup operation or a file operation performed by a distributed file system (DFS), storing by the system (e.g., caching component 126), using the processor (e.g., processor 107), a name cache entry for each directory element accessed during the lookup operation or the file operation.

It will be appreciated that in one or more embodiments, the storing operation 802 can comprise storing by the system (e.g., caching component 126), for a directory element of the directory elements accessed during the lookup operation or the file operation, a reference to a name cache entry of a parent directory element of the directory element.

Operation 804 can comprise determining, by the system (e.g., request component 128), that the name cache entries for all of the directory elements to be referenced in the compound command are available in place of sending individual lookup operation requests for all of the directory elements to the DFS.

Operation 806 can comprise sending, by the system (e.g., request component 128), to the DFS, a single request. The single request can comprise a compound command that can comprise requests for a set of compounded lookup operations directed to any directory elements for which the name cache entries are stored, and for a compounded file operation. The lookup operation or the file operation can comprise an application programming interface call or an NFS server request, such as where the server 102 is a NFS server of an NFS.

Operation 808 can comprise, for a specified directory element of the directory elements accessed during the lookup operation or the file operation, including, by the system (e.g., request component 128), in the compound command, path data for linking or renaming the specified directory element. That is, the compound command can be requested for a linking operation or renaming operation of the specified directory element.

Operation 810 can comprise, including, by the system (e.g., request component 128), in the set of compounded lookup operation requests, only lookup operation requests for all directory elements in a file name string supplied in a file openat operation request included in the compound command as the compounded file operation request.

Operation 812 can comprise executing the operations 802-810 by the processor (e.g., processor 107) without executing in response to any delegation from the DFS.

FIG. 9 summarizes various example operations, e.g., corresponding various operations of a process 900 that also can manage requesting a file operation at a file server. Repetitive description of like elements and/or processes employed in respective embodiments is omitted for sake of brevity.

Operation 902 can comprise generating, by the system (e.g., request component 128), using a processor (e.g., processor 107), a single compound command comprising lookup operation requests for a set of all directory elements along a file path from a file system root up to a file of interest, and further comprising a file operation request applicable to the file of interest.

It will be appreciated that if the file operation is "rename" file operation, there can be two lookup sequences performed including a first lookup sequence corresponding to the path (up to the final file name) of the current file name, and a second lookup sequence corresponding to the path (again, up to the final name) of the new name. While often the paths are the same (e.g., renaming within the directory), the rename command can provide for both paths to be specified.

Operation 904 can comprise performing, by the system (e.g., request component 128), prior to the sending of the single compound command, a lookup operation by reading a name cache entry external to the DFS for a directory element of the set of all directory elements along the file path.

Operation 906 can comprise performing by the system (e.g., request component 128), lookup operations, using the processor (e.g., processor 107), for all of the directory elements of the set of all directory elements prior to the sending of the single compound command, by reading a set of name cache entries, for the set of all directory elements, stored external to the DFS.

Operation 908 can comprise sending, by the system (e.g., request component 128), using the processor (e.g., processor 107), the single compound command to a distributed file-system (DFS).

Operation 910 can comprise in response to receiving a notification of failure to execute the single compound command from the DFS, deleting, by the system (e.g., caching component 126), using the processor (e.g., processor 107), a name cache entry stored external to the DFS.

Operation 912 can comprise in response to receiving a symbolic link from the NFS server as a result of execution of the single compound command, reading, by the system (e.g., request component 128), using the processor (e.g., processor 107), the symbolic link and caching, by the system (e.g., caching component 126), using the processor (e.g., processor 107), a name of all directory elements of the symbolic link.

Operation 914 can comprise, in response to operation 912, caching, by the system (e.g., caching component 126), using the processor (e.g., processor 107), the name of all directory elements referenced in the symbolic link without directly caching the symbolic link.

Operation 916 can comprise sending, by the system (e.g., request component 128), the single compound command without also sending individual lookup operation requests.

FIG. 10 summarizes various example operations, e.g., corresponding various operations of a process 1000 that also can manage requesting a file operation at a file server. Repetitive description of like elements and/or processes employed in respective embodiments is omitted for sake of brevity.

Operation 1002 can comprise conducting, by a system (e.g., request component 128) operatively coupled to a processor (e.g., processor 107), a cache lookup external to a network file system (NFS).

Operation 1004 can comprise conducting, by the system (e.g., request component 128), the cache lookup without reading any directory handle stored external to the NFS.

Operation 1006 can comprise generating, by the system (e.g., request component 128), a single request including a request for a specified file operation. The specified file operation can be a file link operation, a file rename operation, a file open operation, or a file unlink operation Operation 1008 can comprise, for a directory element having a name cache entry stored external to the NFS, including, by the system (e.g., request component 128), in the single request a sub-request that the NFS perform a lookup operation of the directory element.

Operation 1010 can comprise sending, by the system (e.g., request component 128), to the NFS a single request including a request for a specified file operation.

Operation 1012 can comprise bypassing sending, by the system (e.g., request component 128), to the NFS, a separate lookup operation request apart from the single request, based on a result of the conducting of the cache lookup external to the NFS.

Operation 1014 can comprise sending, by the system (e.g., request component 128), a lookup operation request to the NFS server in response to failure of the cache lookup external to the NFS.

Operation 1016 can comprise caching, by the system (e.g., caching component 126), a name of a directory element, to which the lookup operation request is directed, external to the NFS.

Operation 1018 can comprise determining, by the system (e.g., request component 128), whether a directory element name returned by the NFS refers to a directory or to a symbolic link.

For simplicity of explanation, the computer-implemented methodologies and/or processes provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operations of processes 800, 900 and/or 1000 are example operations, and that there can be one or more embodiments that implement more or fewer operations than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein can be used external to a distributed file system (DFS), such as a network file system (NFS), to reduce the complexity of facilitating a file operation at the DFS.

A system that can use the name caching and request the file operation of the DFS can comprise a processor and a memory that stores executable instructions that, when executed by the processor, facilitate performance of operations. The operations can comprise, in response to a lookup operation or a file operation performed by a DFS, storing, using the processor, a name cache entry for each directory element accessed during the lookup operation or the file operation. The operations further can comprise sending, to the DFS, a single request that comprises a compound command comprising requests for a set of lookup operations and for a file operation.

In view of the one or more embodiments described herein, generally, name caching can be performed for directory entries of interest and the name caching entries can be employed in place of individual lookup operations to a DFS in connection with a file operation relative to a file of interest. Where name cache entries are valid and consistent with a state of the DFS, some use of the DFS can be avoided.

Indeed, the typical lookup operations for directory elements can be satisfied employing the name caching external to the DFS. This is because an assumption is made by the one or more embodiments that the name cache entries external to the DFS are valid, until such time that a single (e.g., compile) request for a file operation is made to a DFS. In this way, multiple round trips to and from the DFS can be omitted. Delegation is not requested. In cases where delegation cannot be requested or is not granted, development of a specific client-based delegation tool can be avoided.

A practical application of one or more techniques performed by one or more embodiments described herein can be generating and sending a single request to a respective DFS to facilitate a call operation or other file operation, including but not limited to a file link operation, file rename operation, file open operation, or file unlink operation.

In one example, as one real-world result of performance of operations described herein, a single request can be generated and sent, and thus a single return communication can be received relative to the request from the DFS. The single request can carry a full file path relative to a file of interest of the file operation being requested. Where the single return communication includes an error, such as a path unavailable error, the return communication can be analyzed to determine where the error occurred, and individual lookup operations can be requested to the DFS to update one or more name cache entries.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of data storage and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively generate and/or employ name caching in the time that one or more embodiments described herein can facilitate this process. And, neither can the human mind nor a human with pen and paper electronically generate and/or employ name caching as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Computing Environment

FIG. 11 is a schematic block diagram of a computing environment 1100 with which the described subject matter can interact. The system 1100 comprises one or more remote component(s) 1110. The remote component(s) 1110 can be hardware and/or software (e.g., threads, processes, computing devices). In one or more embodiments, remote component(s) 1110 can be a distributed tiered computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In one or more embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Example Operating Environments

To provide further context for various aspects of the subject specification, FIGS. 12 and 13 illustrate, respectively, a block diagram of an example distributed file storage system 1200 that can employ tiered cloud storage and block diagram of a computer 1302 that can execute the disclosed storage architecture, such as of FIG. 1, in accordance with one or more embodiments described herein. For example, one or more aspects of distributed file storage system 1200 and computer 1302 can be used to implement server 102 of FIG. 1, and aspects of computer 1302 can be used to implement client computer 104 and client computer 103 of FIG. 1.

Referring now to FIG. 12, there is illustrated an example local storage system including cloud tiering components and a cloud storage location in accordance with implementations of one or more embodiments described herein. Client device 1202 can access local storage system 1290. Local storage system 1290 can be a node and cluster storage system. Local storage system 1290 can also store the local cache 1292 for access by other components. It can be appreciated that the systems and methods described herein can run in tandem with other local storage systems as well.

As more fully described below with respect to redirect component 1210, redirect component 1210 can intercept operations directed to stub files. Cloud block management component 1220, garbage collection component 1230, and caching component 1240 may also be in communication with local storage system 1290 directly as depicted in FIG. 12 or through redirect component 1210. A client administrator component 1204 can use an interface to access the policy component 1250 and the account management component 1260 for operations as more fully described below with respect to these components. Data transformation component 1270 can operate to provide encryption and compression to files tiered to cloud storage. Cloud adapter component 1280 can be in communication with cloud storage 1 and cloud storage N, where N is a positive integer. It can be appreciated that multiple cloud storage locations can be used for storage including multiple accounts within a single cloud storage location as more fully described in implementations of one or more embodiments described herein. Further, a backup/restore component 1297 can be utilized to back up the files stored within the local storage system 1290.

Cloud block management component 1220 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, can be still stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in one or more operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1220 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1260 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1220 based on list of mappings it manages. For example, each stub can be associated with an account, and the cloud block management component 1220 can aggregate information from a set of stubs associated with the same account. Other example statistics that can be maintained include the number of recalls, the number of writes, the number of modifications, the largest recall by read and write operations, etc. In one implementation, multiple accounts can exist for a single cloud service provider, each with unique account names and access codes.

The cloud adapter component 1280 manages the sending and receiving of data to and from the cloud service providers. The cloud adapter component 1280 can utilize a set of APIs. For example, each cloud service provider may have provider specific API to interact with the provider.

A policy component 1250 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1230. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1230 can be used to determine which files/objects/data constructs remaining in both local storage and cloud storage can be deleted. In one implementation, the resources to be managed for garbage collection include cloud metadata objects (CMOs), cloud data objects (CDOs) (e.g., a cloud object containing the actual tiered content data), local cache data, and cache state information.

A caching component 1240 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1220, files that are tiered are split into chunks and in one or more implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1240 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data can be represented by clear, adding existing file information to the cache can be represented by fill, adding new information to the cache by write, reading information from the cache can be represented by read following a fill, updating existing file information to the cache can be represented by fill followed by a write, and truncating cache due to file operation can be represented by sync and then a partial clear.

A data transformation component 1270 can encrypt and/or compress data that is tiered to cloud storage. In relation to encryption, it can be appreciated that when data is stored in off-premises cloud storage and/or public cloud storage, users can request data encryption to ensure data is not disclosed to an illegitimate third party. In one implementation, data can be encrypted locally before storing/writing the data to cloud storage.

In one implementation, the backup/restore component 1297 can transfer a copy of the files within the local storage system 1290 to another cluster (e.g., target cluster). Further, the backup/restore component 1297 can manage synchronization between the local storage system 1290 and the other cluster, such that, the other cluster is timely updated with new and/or modified content within the local storage system 1290.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 13, the example operating environment 1300 which can implement one or more embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/ wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding Figures, where applicable, it is to be understood that other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the one or more specific forms described, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, comprising:
in response to a first operation, comprising a lookup operation or a file operation, performed by a distributed file system (DFS), caching external to the DFS, using the processor, name cache entries for directory elements accessed during the first operation;
subsequent to the caching, sending, to the DFS, a single request that comprises a compound command comprising requests for:
a set of compounded lookup operations of the lookup operations directed to a group of plural directory elements, of the directory elements, for which the name cache entries are cached external to the DFS, and
a compounded file operation being a same or different operation relative to the first operation,
wherein the sending is performed absent a performance of an omitted operation that would comprise sending, to the DFS, a request for individual lookup operation requests for the plural directory elements of the group of plural directory elements, which were accessed during the first operation, and
wherein instead, the operations further comprise generating, by the system, the single request comprising information regarding plural name cache entries of the name cache entries included in the single request, and wherein the plural name cache entries included in the single request were cached external to the DFS; and
subsequent to the sending of the single request,
receiving a symbolic link from the DFS as a result of execution of the single compound command,
reading the symbolic link and caching, external to the DFS, a name of all directory elements of the symbolic link, and caching the name of all directory elements referenced in the symbolic link without directly caching the symbolic link.

2. The system of claim 1, wherein the operations further comprise:
determining that the name cache entries for all of the plural directory elements to be referenced in the compound command are available external to the DFS in place of sending individual lookup operation requests for all of the directory elements to the DFS.

3. The system of claim 1, wherein the operations further comprise:
for a specified directory element of the directory elements accessed during the first operation, including, in the compound command, path data for linking or renaming the specified directory element,
wherein the compound command is requested for a linking operation or renaming operation of the specified directory element.

4. The system of claim 1, wherein the operations further comprise:
including, in the set of compounded lookup operation requests, only lookup operation requests for all directory elements in a file name string supplied in a file open at operation request included in the compound command as the compounded file operation request.

5. The system of claim 1, wherein the caching of the name cache entries comprises caching, for a specified directory element of the directory elements accessed during the first operation, a reference to a name cache entry of a parent directory element of the specified directory element.

6. The system of claim 1, wherein the first operation comprises an application programming interface call or a DFS server request.

7. The system of claim 1, wherein the sending of the single request to the DFS absent the performance of the omitted operation is executed other than in response to any delegation from the DFS to cache the name cache entries.

8. A non-transitory machine-readable medium, comprising executable instructions that, when executed by a processor facilitate performance of operations, comprising:
caching in response to a first operation, the first operation being performed by a distributed file system (DFS), a cache directory for directory elements accessed during the first operation, wherein the caching is performed external to the DFS and comprises plural name cache entries;
generating, using the at least one processor, a single compound command comprising compounded lookup operation requests for a set of all directory elements, of the directory elements accessed during the first operation, along a file path from a file system root up to a file of interest, and the single compound command further comprising a file operation request applicable to the file of interest;
sending, using the at least one processor, the single compound command to the DFS absent a performance of an omitted operation that would comprise sending, to the DFS, a request for individual lookup operation requests for the directory elements along the file path from the file system root up to the file of interest,
generating, using the at least one processor, the single compound command to a kernel API associated with the DFS, the generating comprising employing, using the at least one processor, the cache directory and the plural name cache entries comprised by the cache directory, the employing being performed external to the DFS, and the single compound command comprising information corresponding to the cache directory; and in response to receiving a symbolic link from the DFS as a result of execution of the single compound command, reading, using the at least one processor, the symbolic link and caching external to the DFS, using the at least one processor, a name of all directory elements of the symbolic link, and caching, using the at least one processor, the name of all directory elements referenced in the symbolic link without directly caching the symbolic link.

9. The non-transitory machine-readable medium of claim 8, wherein the operations further comprise:

performing, prior to the sending of the single compound command, lookup operations by reading a name cache entry, cached in response to the first operation, external to the DFS for a directory element of the set of all directory elements along the file path.

10. The non-transitory machine-readable medium of claim 8, wherein the operations further comprise:

performing lookup operations, using the at least one processor, for all of the directory elements of the set of all directory elements prior to the sending of the single compound command, by reading a set of name cache entries, cached in response to the first operation, for the set of all directory elements, cached external to the DFS.

11. The non-transitory machine-readable medium of claim 8, wherein the operations further comprise:

in response to receiving a notification of failure to execute the single compound command from the DFS, deleting, using the at least one processor, a name cache entry, cached in response to the first operation, that is cached external to the DFS.

12. The non-transitory machine-readable medium of claim 8, wherein the sending of the single compound command to the DFS absent the performance of the omitted operation is executed, using the at least one processor, without executing in response to any delegation from the DFS to cache the plural name cache entries.

13. A method, comprising:

caching, by a system operatively coupled to at least one processor, in response to a first operation performed by a network file system (NFS), a cache directory for directory elements accessed during the first operation, wherein the caching is performed external to the NFS, and wherein the cache directory comprises plural name cache entries;

conducting, by the system, a cache lookup external to the NFS, wherein the system is external to the NFS;

generating, by the system, a single request comprising a request for a specified file operation different from the first operation, wherein the single request further comprises a set of compounded lookup operations directed to a group of plural directory elements, of the directory elements cached at the cache directory as the plural name cache entries;

sending, to the NFS, the single request;

based on a result of the conducting of the cache lookup external to the NFS, and based on a communication to the NFS comprising information corresponding to the cache lookup, the communication corresponding to the single request, bypassing sending, to the NFS, a separate lookup operation request, for any of the information corresponding to the cache lookup, including any individual cache lookup request for a directory element of the group of plural directory elements; and subsequent to the sending of the single request, receiving a symbolic link from the NFS as a result of execution of the set of compounded lookup operations, reading the symbolic link and caching, external to the NFS, a name of all directory elements of the symbolic link, and caching the name of all directory elements referenced in the symbolic link without directly caching the symbolic link.

14. The method of claim 13, further comprising:

sending a lookup operation request to the NFS in response to failure of the cache lookup external to the NFS; and caching a name of a directory element, to which the lookup operation request is directed, external to the NFS.

15. The method of claim 13, wherein the conducting the cache lookup is performed without reading any directory handle cached external to the NFS.

16. The method of claim 13, further comprising:

determining whether a directory element name returned by the NFS refers to a directory or to a symbolic link.

17. The method of claim 13, further comprising:

conducting, by the system, the cache lookup, external to the NFS, for a plurality of directory elements, of the group of plural directory elements, that are to be included in the single request.

* * * * *